(12) United States Patent
Akin

(10) Patent No.: US 8,431,868 B1
(45) Date of Patent: Apr. 30, 2013

(54) THERMALLY REGULATED ELECTRICAL DEICING APPARATUS

(76) Inventor: John T. Akin, Norman, OK (US)

( * ) Notice: Subject to any disclaimer, the term of this patent is extended or adjusted under 35 U.S.C. 154(b) by 464 days.

(21) Appl. No.: 12/688,701

(22) Filed: Jan. 15, 2010

Related U.S. Application Data

(63) Continuation-in-part of application No. 11/136,191, filed on May 24, 2005, now abandoned.

(60) Provisional application No. 60/575,229, filed on May 28, 2004.

(51) Int. Cl.
*B60L 1/02* (2006.01)

(52) U.S. Cl.
USPC ............ 219/203; 219/202; 219/522; 219/528; 219/529; 219/477

(58) Field of Classification Search .................. 219/203, 219/202, 522, 528, 529, 477
See application file for complete search history.

(56) References Cited

U.S. PATENT DOCUMENTS

| | | | |
|---|---|---|---|
| 2,666,840 A | 1/1954 | Poirier | |
| 3,422,244 A | 1/1969 | Lauck, III | |
| 4,399,347 A | 8/1983 | Schmitt | |
| 4,811,982 A | 3/1989 | Carlyle | |
| 4,867,216 A | 9/1989 | McKee | |
| 4,967,057 A | 10/1990 | Bayless et al. | |
| 5,035,460 A | 7/1991 | Huang | |
| 5,160,827 A | 11/1992 | Parker | |
| 5,211,438 A | 5/1993 | Snow | |
| 5,290,085 A | 3/1994 | Takagi | |
| 5,408,068 A | 4/1995 | Ng | |
| 5,424,898 A | 6/1995 | Larson et al. | |
| 5,697,416 A | 12/1997 | Bock et al. | |
| 5,765,779 A | 6/1998 | Hancock et al. | |
| 6,058,554 A * | 5/2000 | Warren | 15/250.06 |
| 6,100,500 A | 8/2000 | Jefferson, Jr. et al. | |
| 6,283,656 B1 | 9/2001 | Jiang | |
| 6,294,768 B1 | 9/2001 | Liebich | |
| 6,483,086 B1 | 11/2002 | Wolff et al. | |
| 6,489,594 B2 | 12/2002 | Jones | |
| 6,513,853 B2 | 2/2003 | Langley | |
| 6,598,653 B1 | 7/2003 | Gonzalez | |
| 6,662,839 B1 | 12/2003 | Thayer | |
| 6,664,512 B2 | 12/2003 | Horey et al. | |
| 6,779,222 B2 * | 8/2004 | Tobias | 15/250.07 |

(Continued)

FOREIGN PATENT DOCUMENTS

| | | |
|---|---|---|
| WO | WO 8810056 | 12/1988 |

*Primary Examiner* — Eugene Lee
(74) *Attorney, Agent, or Firm* — Hall Estill Attorneys at Law; Daniel P. Dooley

(57) ABSTRACT

A thermally regulated electrical deicing apparatus with a flexible cover portion is mounted to an exterior surface of a vehicular windshield; the flexible cover portion includes an electrical deicing element with either a resistance element heat tape or a serpentine woven heating element directed therethrough in electrical communication with an alternating current power supply. A thermistor effects selective heating in the heating element. The electrical deicing element further includes a male alternating current electrical plug conducting current to the heating element through an electrical power supply line, wherein the thermistor is interposed between the male alternating current plug and the heating element, and controls the current conducted to the heating element; and a female alternating current electrical plug attached to the power supply line, which provides a connection means for a second thermally regulated electrical deicing apparatus.

18 Claims, 4 Drawing Sheets

U.S. PATENT DOCUMENTS

| | | |
|---|---|---|
| 6,855,915 B2 | 2/2005 | Gehring |
| 6,963,049 B1 | 11/2005 | Martin et al. |
| 2003/0006226 A1 | 1/2003 | Yanagimoto et al. |
| 2003/0104134 A1 | 6/2003 | Linford et al. |
| 2004/0197534 A1 | 10/2004 | Miller et al. |
| 2007/0181565 A1* | 8/2007 | Murahashi et al. ........... 219/629 |

* cited by examiner

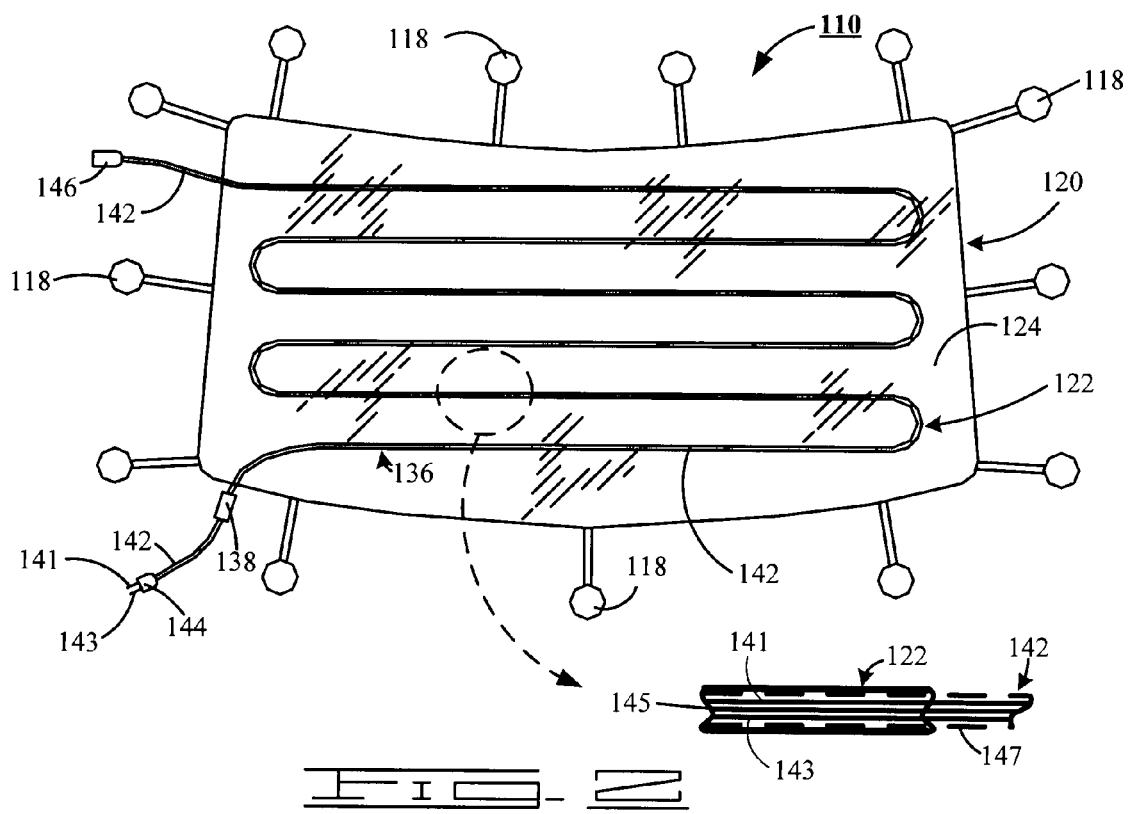
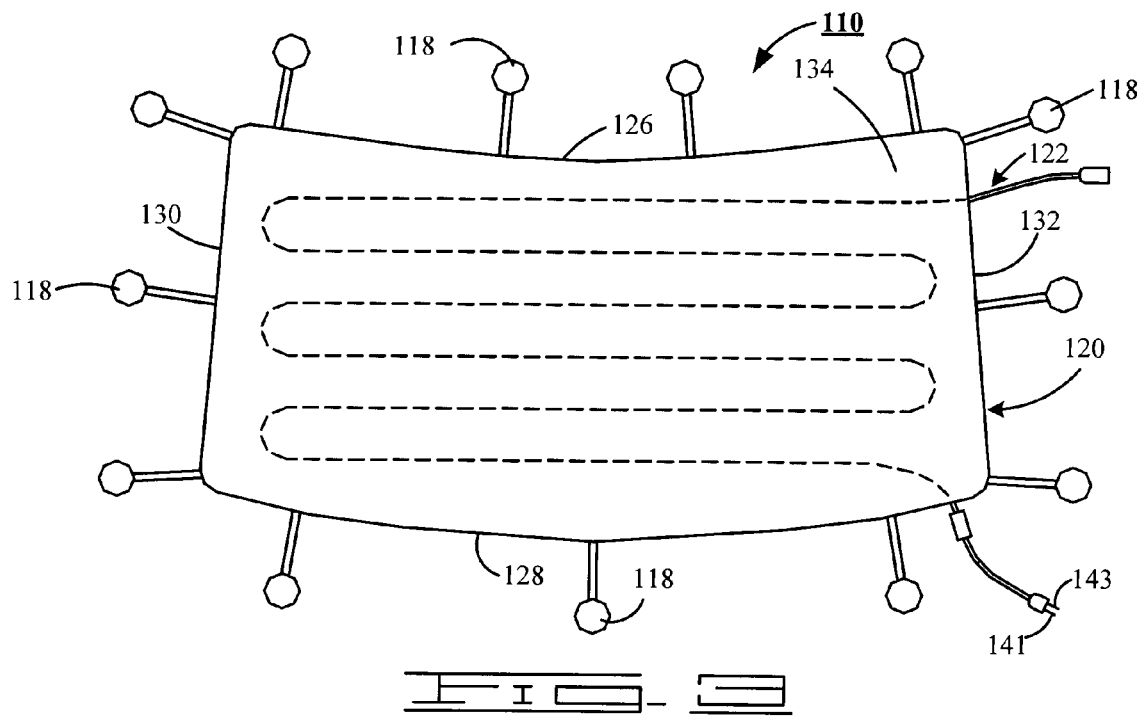

THERMALLY REGULATED ELECTRICAL DEICING APPARATUS

RELATED APPLICATIONS

This application is a continuation-in-part application of U.S. patent application Ser. No. 11/136,191 filed May 24, 2005, entitled "Thermally Regulated Electrical Deicing Apparatus," which claims priority to U.S. Provisional Patent Application No. 60/575,229 filed May 28, 2004, entitled "Deicing Device For A Vehicle Window."

FIELD OF THE INVENTION

The claimed invention relates to the field of automotive equipment; more particularly, but not by way of limitation, to a thermally regulated electrical deicing apparatus for deicing vehicular windows.

BACKGROUND

One important step for improved driving safety in cold climates is the removal of frost, ice, and snow from vehicular windows prior to engaging in operation of the vehicle. An ability to clearly see road hazards, alterations in the direction of the roadway, intersections with other roadways, and other vehicles utilizing the roadways greatly improves a driver's ability to avoid accidents.

During the winter months of many regions, motorists that do not have access to covered parking facilities are faced with a nearly daily daunting task of clearing off their windshields prior to operating their vehicles. This task can be cold and hazardous. A windshield scraper, often with a brush feature at a proximal end and a scraper blade at a distal end, is a device used for the purpose of removing frost, ice, and snow from vehicular windows. When using a windshield scraper on frost, and nearly always on ice, obtaining good footing, in order to supply sufficient force to the scraper, is a key aspect of a successful removal of solidified moisture from automotive windshields. However, under icy conditions, good footing is often hard to obtain, which can and has led to serious "slip and fall" mishaps, resulting in contusions, lacerations, broken bones and even serious head injuries.

A number of solutions have been proposed in the art, each with their own drawbacks. One alternative to scraping frozen moisture accumulations from vehicles windows and windshields involves placing a sheet of paper, canvas, plastic, or other material over the outside of the windshield. However, unless somehow secured to the windshield, these materials are subject to being displaced by the wind or the weight of ice and snow, leaving the windshield unprotected. Furthermore, rain, sleet, or snow can easily penetrate the gaps between the edges of the sheet and the windshield to accumulate on the windshield underneath the sheet, causing the sheet to freeze to the windshield, which creates as many removal problems, if not more, for the driver.

Liquid deicing agents are also known in the art. However, such agents typically include chemicals that are, held under pressure; flammable; harmful to humans; and often sold in containers that need proper disposal upon their exhaustion. Upon application of such agents, vehicle operators are advised to allow the product to remain in contact with the moisture solidified on the windshield, avoid contact with the skin and eyes, and avoid inhaling the fumes. Repetitive application is advised for heavy ice accumulation, which increases the risk factors for the vehicle operator.

As such, challenges remain and a need persists for improvements in methods and devices for deicing vehicular windows.

SUMMARY OF THE INVENTION

In accordance with preferred embodiments, a thermally regulated electrical deicing apparatus arranged for securement adjacent an exterior portion of a vehicular windshield is provided. The thermally regulated electrical deicing apparatus includes a flexible cover portion with a top edge spaced from a bottom edge and side edges respectfully extending there between; and securement means attached to a front cover face of the flexible cover portion for attachment of the apparatus adjacent the windshield exterior. An electrical deicing element supported by a rear cover face of the flexible cover portion provides energy during deicing of the windshield exterior. The electrical deicing element includes, an alternating current male electrical plug conducting current to a heating element through an electrical power supply line; a thermistor interposed between the male plug and the heating element controls the current conducted to the heating element; and an alternating current female electrical plug communicating with the power supply line provides a connection for a second thermally regulated electrical deicing apparatus.

These and various other features and advantages that characterize the claimed invention will be apparent upon reading the following detailed description and upon review of the associated drawings.

BRIEF DESCRIPTION OF THE DRAWINGS

FIG. 2 is an elevational view of a rear cover face of a thermally regulated electrical deicing apparatus of the instant invention.

FIG. 3 is an elevational view of a front cover face of the thermally regulated electrical deicing apparatus of FIG. 2.

DETAILED DESCRIPTION

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
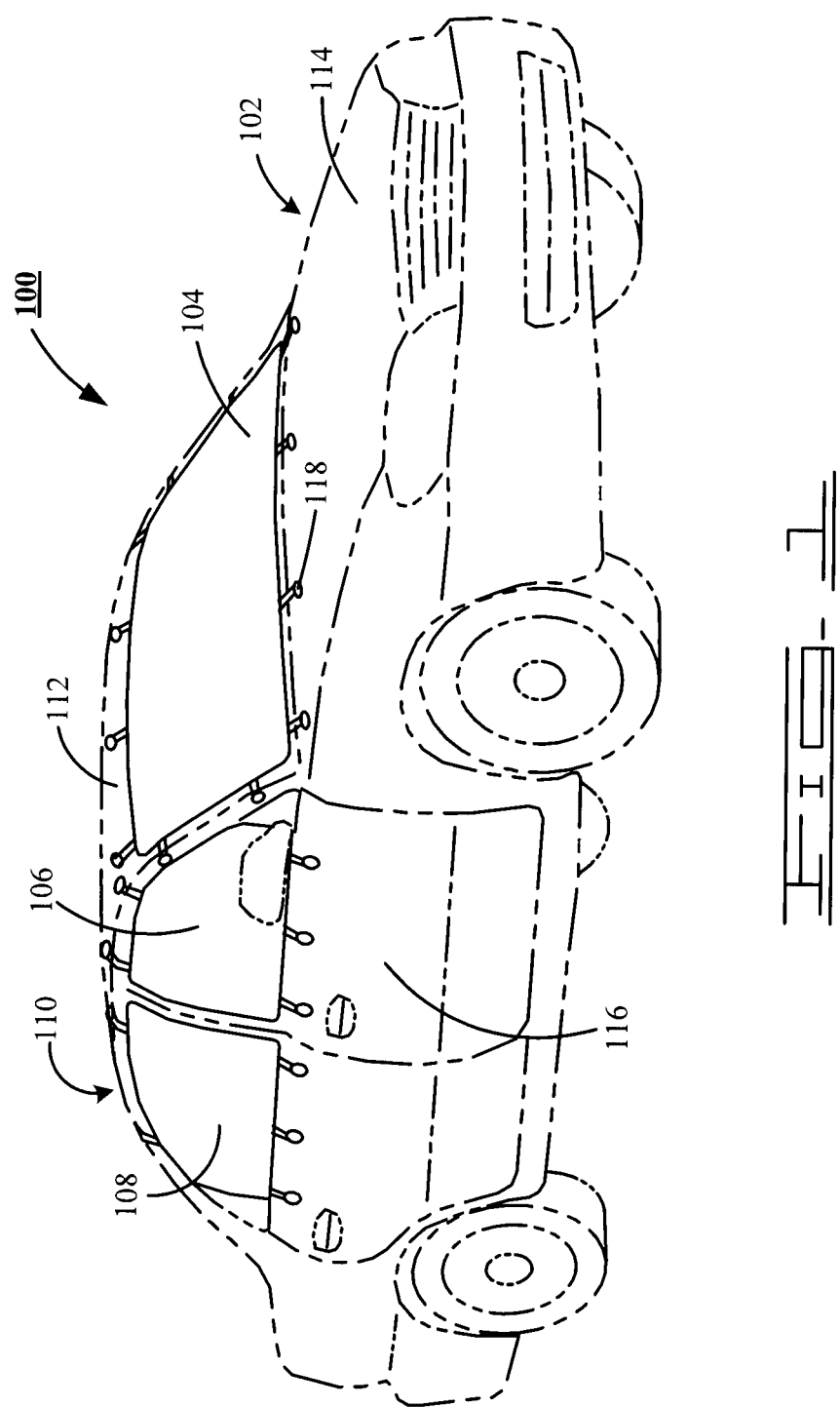
FIG. 1 is a perspective view illustration of a vehicular deicing system of the instant invention in relation to a vehicle.

Referring to the drawings, FIG. 1 shows a vehicular deicing system (VDS) 100 covering window and windshield portions of a motor vehicle 102. The VDS 100 includes at least one thermally regulated electrical deicer (TRED) portion, such as front windshield TRED 104. The VDS 100 may also include additional portions such as a front side window TRED 106, a rear side window TRED 108, or a rear window TRED 110 (shown by FIG. 2).

In preferred embodiments, each TRED portion of the VDS 100 may be secured to the motor vehicle 102, in the region of a vehicle roof 112 and/or hood 114 or door 116, by utilizing a securing means 118 such as magnets, a self adhering magnetic tape providing adhesive on one side, suction devices, straps, etc., which may be secured to any or all top, bottom, or side portions of each TRED portion of the VDS 100. The securing means 118 may serve to connect each TRED portion to the vehicle roof 112 and/or hood 114 or door 116, of the motor vehicle, and may also serve to prevent, or minimize, the entry of snow, ice, freezing rain, dust, etc., or other foreign matter, from entering into the region between the window or windshield and each respective TRED portion.

For illustrative purposes, FIG. 2 shows the rear window TRED 110 generally as it would appear as seen through the inside of the motor vehicle 102. TRED 110 includes a flexible cover portion 120 supporting a continuous electrical deicing element (also referred to herein as the heating element) 122 on a rear cover face 124. The flexible cover portion 120 may be made from any of many materials including natural, synthetic, or blended fabrics as well as sheet material of natural, polymeric, or combination composites.

An example of a polymeric material found useful in forming the flexible cover portion 120 is constructed from novoloid fibers. Novoloid fibers are preferably cured phenol-aldehyde fibers made by acid-catalyzed cross-linking of melt-spun novolac resin to form a fully cross-linked, three-dimensional, amorphous "network" polymer structure similar to that of thermo-setting phenolic resins. Chemically, the fibers contain approximately 76% carbon, 18% oxygen, and 6% hydrogen.

The rear cover face 124 may include a thermally reflective film, such as a metal film deposited thereon to reflectively aid in transferring thermal energy developed by the continuous electrical deicing element 122 to the windshield and windows. The continuous electrical deicing element 122 may be based on market available components including heat tape products provided by Smith Gates Corporation of Denver, Colo., or serpentine woven heating elements provided by Laco Technologies of Salt Lake City, Utah.

More specifically, as exemplified by TRED 110 of FIG. 3, each TRED portion of the VDS 100 of the instant invention comprises a flexible cover portion, such as 120, defined by a top edge 126 spaced from a bottom edge 128, with first side edge 130 and second side edge 132 respectfully extending there between. The flexible cover portion 120 defines a front cover face 134 and the rear cover face 124 (of FIG. 2).

In a preferred embodiment, secured to the front cover face 134 are a number of the plurality of securing means 118 arranged adjacent the respective top edge 126, bottom edge 128, first side edge 130 and second side edge 132. The continuous electrical deicing element 122 is supported by the rear cover face 124 within the respective edges of the flexible cover portion 120. The continuous electrical deicing element 122 extends coextensively within the flexible cover portion 120 and defines a serpentine configuration to impart heat energy developed by the body of the continuous electrical deicing element 122 to frozen moisture accumulations collected on exterior surfaces of vehicular windows and windshields.

Figures 4, 5:
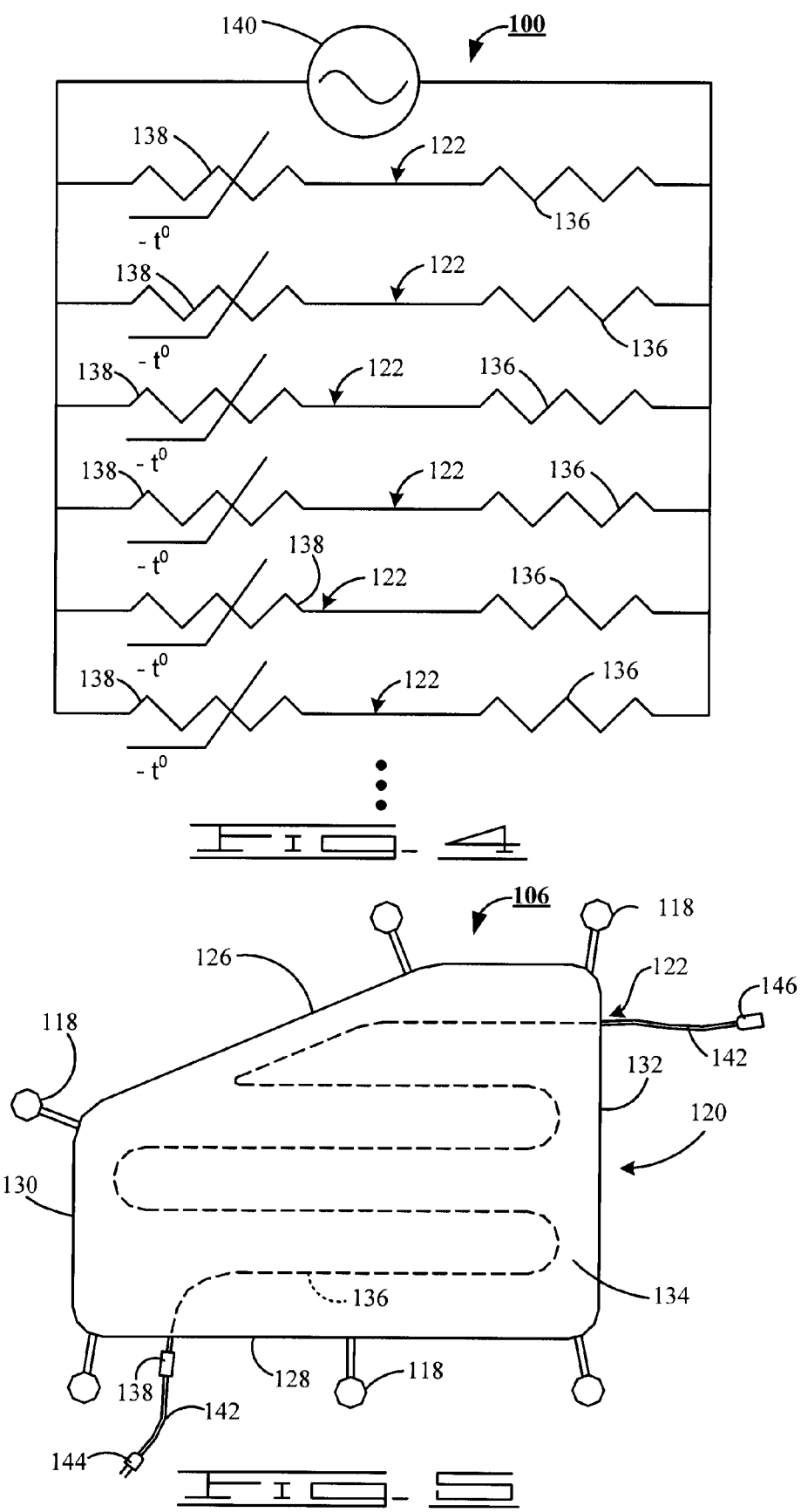
FIG. 4 is a circuit diagram of the thermally regulated electrical deicing apparatus of FIG. 2.
FIG. 5 is an elevational view of a rear cover face of a thermally regulated electrical deicing apparatus configured for a front left window portion of the vehicular deicing system of FIG. 1.

As shown by FIG. 4, in a preferred embodiment, the VDS 100 incorporates a parallel circuit for independent and simultaneous operation of each continuous electrical deicing element 122. FIG. 4 further shows that each heating element 136 of each continuous electrical deicing element 122 is independently controlled by a thermistor 138, which curtails the flow of alternating current (AC) from current supply 140 to its respective heating element 136 upon attainment of a predetermined temperature. During operation, following curtailment of the current supplied to the heating element 136, the thermistor 138 again promotes flow of current from the AC current supply 140 to the heating element 136, once the temperature of the heating element 136 has dropped an amount sufficient to reactivate the thermistor 138. In an alternate preferred embodiment, a rheostat rather than the thermistor 138 is used for controlling flow of current from the AC current supply 140 to the heating element 136 of the continuous electrical deicing element 122.

Returning to FIG. 2, an electrical power supply line 142, which includes an electrically "hot" low resistance, minimal heat generating AC conductor 141 (hot conductor 141), and an electrically "neutral" low resistance, minimal heat generating conductor 143, (neutral conductor 143), directs electrical energy into the heating element 136 through the thermistor 138, when a male AC electrical plug 144 is connected to a power outlet communicating with the AC current supply 140. The deicing element 122 is in contacting adjacency with and runs physically parallel to the electrical supply line 142, which extends between the male AC electrical plug 144 and the female AC electrical plug 146. In addition to the male AC electrical plug 144, the electrical power supply line 142 for each TRED portion of the VDS 100 (of FIG. 1) further includes a female AC electrical plug 146. The female AC electrical plug 146 is provided on each TRED to allow daisy-chaining together a plurality of TREDS, which can be operated by a single AC outlet. In other words, the hot conductor 141 and the neutral conductor 143 run continuously in parallel across the AC current supply 140 and between the male AC electrical plug 144 and the female AC electrical plug 146, and parallel to the deicing element 122 to assure AC power is always available at the female AC electrical plug (when the male AC electrical plug 144 is connected to the AC power source 140), even when no current flows through the deicing element 122. Additionally, because the deicing element 122 is connected in parallel with the hot conductor 141, no current flows through the deicing element 122 without the presence of an AC voltage on the hot conductor 141. As further shown by FIG. 2, the electrical supply line includes an insulating sheath 147 enclosed by the deicing element 122, the insulating sheath confining a hot conductor 141, a neutral conductor 143, and a ground conductor 145.

FIG. 5 shows that the front side window TRED 106 includes the securing means 118 attached to the front cover face 134 of the flexible cover portion 120, and the continuous electrical deicing element 122 supported by the rear cover face 124 (not separately shown) of the flexible cover portion 120. As with each TRED portion of the VDS 100 (of FIG. 1), the flexible cover portion 120 of the front side window TRED 106 is defined by the top edge 126 spaced from the bottom edge 128, with first side edge 130 and second side edge 132 respectfully extending there between. The continuous electrical deicing element 122 includes the electrical power supply line 142, which directs electrical energy into the heating element 136 (shown in dotted line) through the thermistor 138, when the male AC electrical plug 144 is connected to a power outlet, or connected to the female AC electrical plug 146 of the electrical power supply line 142, of an adjacent TRED.

Figure 6:
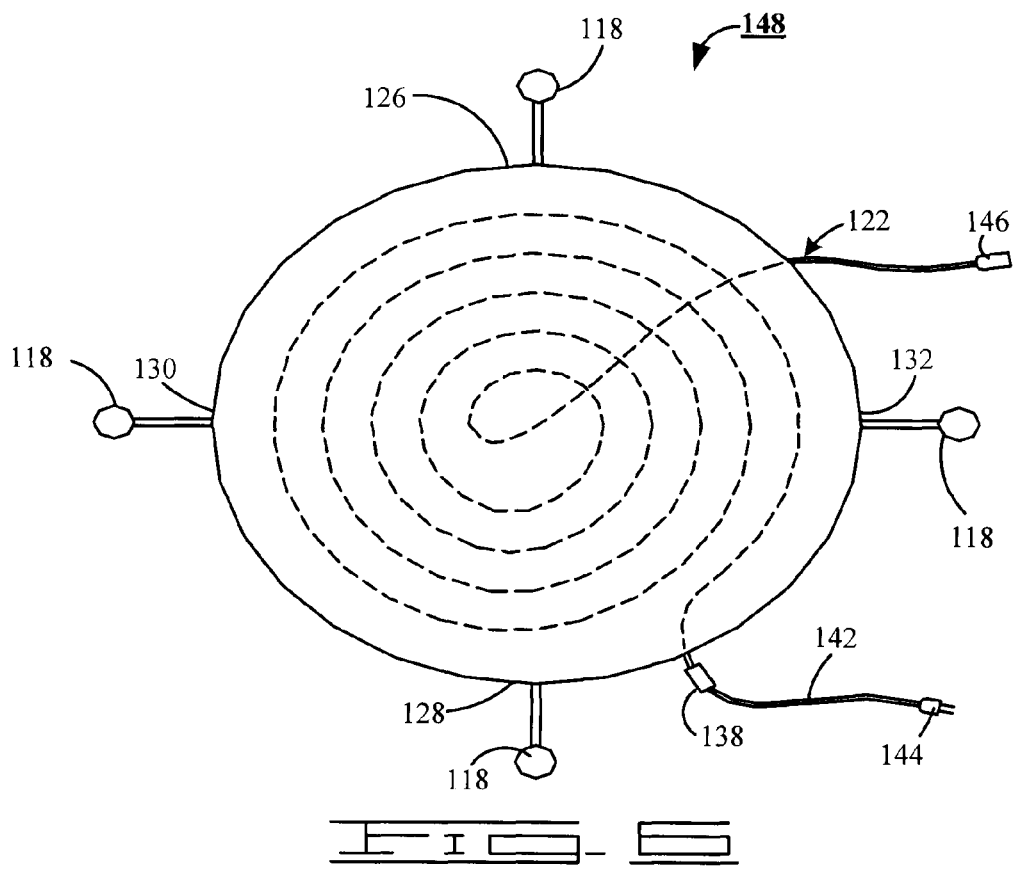
FIG. 6 is an elevational view of an alternate configuration of a thermally regulated electrical deicing apparatus configured for universal application to windows and windshields of the vehicle of FIG. 1.

FIG. 6 shows a universal TRED 148 configuration of an alternate preferred TRED embodiment. Rather than configuring each TRED portion of the VDS 100 (of FIG. 1) to be in general conformance with particular windows and windshields of a motor vehicle, such as 102 (of FIG. 1), the universal TRED 148 is configured for application to any of the windows or windshields of a vehicle. Each TRED 148 is generally constructed in the same manner and of the same materials as the other TREDS described hereinabove. Further, the configuration of the TRED 148 is generally elliptical, and the continuous electrical deicing element 122 is configured in a generally spiral configuration, rather than in a serpentine configuration.

A VDS 100 configured with a plurality of TREDS of the TRED 148 configuration for a vehicle with a front windshield, four side windows, and a rear window, would utilize eight TREDS of the TRED 148 configuration. That is, two for the front windshield, one for each side window and two for the rear window. An advantage of configuring a VDS 100 using TREDS configured as TRED 148 is that the user of the system can modularly construct the system as desired over time. Additionally, there would not be a need for the user to assure that the correct TRED was selected for a particular window configuration when beginning a window deicing process, because each TRED of the VDS 100 constructed using TREDS of the TREDS 148 configuration would be completely interchangeable.

Accordingly, the present invention is directed to a thermally regulated electrical deicing apparatus (TRED) (such as 104) arranged for securement adjacent an exterior of a vehicular windshield portion of a motor vehicle (such as 102). The TRED comprises a flexible cover portion (such as 120) with a top edge (such as 126) spaced from a bottom edge (such as 128) and side edges (such as 130 and 132) respectfully extending there between; a securement means (such as 118) attached to a front cover face (such as 134) of the flexible cover portion is provided for attachment of the apparatus adjacent the windshield exterior.

The TRED further comprises a continuous electrical deicing element (such as 122) supported by a rear cover face (such as 124) of the flexible cover portion that provides thermal energy during deicing of the windshield exterior. The electrical deicing element comprises a male alternating current electrical plug (such as 144) conducting current from a current supply (such as 140) to a heating element (such as 136) through an electrical power supply line (such as 142); a thermistor (such as 138) interposed between the male plug and the heating element controls the current conducted to the heating element; and a female alternating current electrical plug (such as 146) communicating with the power supply line provides a connection for a second thermally regulated electrical deicing apparatus (such as 106).

Figure 7:
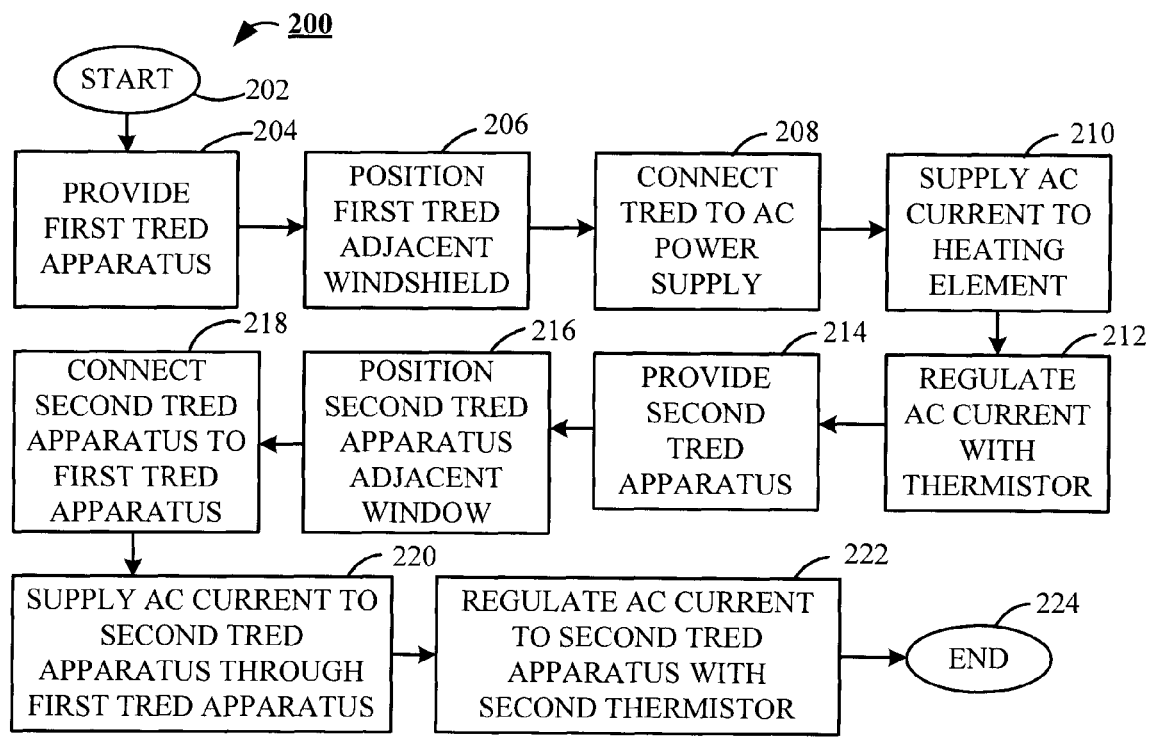
FIG. 7 is a flow diagram of a method of deicing a windshield and a window of the vehicle of FIG. 1.

FIG. 7 shows a method 200 of deicing window and windshield portions of a motor vehicle (such as 102) commencing on start step 202 and continuing at process step 204. At process step 204, a first thermally regulated electrical deicing apparatus ("TRED") (such as 104) is provided for positioning adjacent the windshield of the vehicle at process step 206. At process step 208, the first TRED is connected to an alternating current power sources.

At process step 210, the alternating current is supplied to a heating element (such as 136) of a continuous electrical deicing element (such as 122), and at process step 212, the alternating current supplied to the heating element is regulated by a thermistor (such as 138). At process step 214, a second TRED (such as 106) is provided. At process step 216, the second TRED is positioned adjacent the window of the vehicle. At process step 218, the second TRED is electrically connected to the first TRED.

At process step 220, alternating current is supplied through the first TRED to a second heating element (such as 136) of the second TRED. At process step 222, the alternating current supply to said second heating element of said second TRED is regulated with a second thermistor interposed between the alternating current source and the second heating element, and the process concludes at end process step 224.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claim.

What is claimed is:

1. A thermally regulated electrical deicing apparatus arranged for securement adjacent an exterior portion of a vehicular windshield comprising:
   a flexible cover portion with a top edge spaced from a bottom edge and side edges respectfully extending between said top and bottom edges;
   a securement means, attached to a front cover face of said flexible cover portion, for attachment of said flexible cover portion adjacent an exterior portion of said windshield; and
   an electrical deicing element in direct contact with said windshield and supported by a rear cover face of said flexible cover portion provides energy during deicing of said windshield exterior portion, in which said electrical deicing element comprises:
      a male alternating current electrical plug, which when connected to an alternating current voltage source, conducts voltage to a single heating element through an electrical power supply line; and
      a thermistor interposed in series between said male plug and said single heating element directly controlling the voltage conducted to the single heating element without the aid of additional devices, and in which said thermistor connected in series with said heating element together form a parallel connection with said electrical power supply line, the electrical power supply line including at least a female alternating current electrical plug, an electrically "hot" low resistance, minimal heat generating conductor running continuously physically parallel and adjacent said electrical deicing element and between said male alternating current electrical plug and said female alternating current electrical plug to assure alternating current voltage is available at said female alternating current electrical plug when said male alternating current electrical plug is connected to said alternating current voltage source independent of voltage flow through said electrical deicing element, and wherein alternating current voltage must be present in said electrically "hot" low resistance, minimal heat generating conductor for voltage to flow through said electrical deicing element.

2. The apparatus of claim 1, in which said female alternating current electrical plug provides a connection for a second thermally regulated electrical deicing apparatus, and wherein both the male and female alternating current electrical plugs extend beyond the confines of the flexible cover portion, in which the confines of the flexible cover portion are defined by the top, bottom, and side edges of the flexible cover portion.

3. The apparatus of claim 1, in which said vehicular windshield is disposed between a roof and a hood of a vehicle, and in which said securement means is a magnet member, wherein said magnetic member interacts with said roof to secure said electrical deicing element adjacent said exterior portion of said windshield.

4. The apparatus of claim 3, in which said rear cover face comprises a thermal reflective film.

5. The apparatus of claim 4, in which said flexible cover portion comprises a material constructed from novoloid fibers.

6. The apparatus of claim 4, in which said flexible cover portion comprises a material constructed from nylon fibers.

7. The apparatus of claim 4, in which said flexible cover portion comprises a material constructed from wool fibers.

8. The apparatus of claim 2, in which said second thermally regulated electrical deicing apparatus is arranged for securement adjacent an exterior portion of a vehicular side window and comprises:
 a second flexible cover portion with a top edge spaced from a bottom edge and side edges respectfully extending between said top and bottom edges;
 a second securement means, attached to a front cover face of said second flexible cover portion, for attachment of said second flexible cover portion adjacent an exterior portion of said side window; and
 a second electrical deicing element supported by a rear cover face of said second flexible cover portion provides energy during deicing of said side window exterior portion, in which said second electrical deicing element comprises:
  a second male alternating current electrical plug, which when connected to an alternating current voltage source, conducts voltage to a second single heating element through a second electrical power supply line; and
  a second thermistor interposed in series between said second male plug and said second single heating element, said second thermistor directly controlling the voltage conducted to said second single heating element independent of the voltage conducted to said single heating element, and without the aid of additional devices, and in which said thermistor connected in series with said single heating element together form a parallel connection with said second electrical power supply line.

9. The apparatus of claim 8, in which said vehicular side window is disposed within a vehicle door of the vehicle and adjacent the roof of the vehicle, and in which said securement means is a strap, wherein said strap interacts with said roof and door to secure said electrical deicing element adjacent said exterior portion of said side window.

10. The apparatus of claim 9, in which said rear cover face comprises a thermal reflective film.

11. The apparatus of claim 10, in which said second flexible cover portion comprises a material constructed from novoloid fibers.

12. The apparatus of claim 10, in which said thermally regulated electrical deicing apparatus arranged for securement adjacent said exterior portion of said vehicular windshield, and said second thermally regulated electrical deicing apparatus arranged for securement adjacent said exterior portion of said vehicular side window share a common configuration.

13. The apparatus of claim 12, in which said heating element of said electrical deicing element of said commonly configured thermally regulated electrical deicing apparatus comprises a serpentine configuration adjacent said rear cover face.

14. The apparatus of claim 12, in which said heating element of said electrical deicing element of said commonly configured thermally regulated electrical deicing apparatus comprises a spiral configuration adjacent said rear cover face.

15. A method by steps comprising:
 providing a first thermally regulated electrical deicing apparatus;
 positioning an electrical deicing element of said first thermally regulated electrical deicing apparatus in direct contact with a windshield of a vehicle; and
 connecting said first thermally regulated electrical deicing apparatus to an alternating current voltage source, wherein said electrical deicing element is secured to a rear cover face of a flexible cover, and in which said first thermally regulated electrical deicing apparatus comprises:
  a male alternating current electrical plug, which when connected to an alternating current voltage source, conducts voltage to a single heating element through an electrical power supply line; and
  a thermistor interposed in series between said male plug and said single heating element directly controlling the voltage conducted to the single heating element without the aid of additional devices, and in which said thermistor is connected in series with said heating element together form a parallel connection with said electrical power supply line, the electrical power supply line including at least a female alternating current electrical plug, an electrically "hot" low resistance, minimal heat generating conductor running continuously physically parallel and adjacent said electrical deicing element and between said male alternating current electrical plug and said female alternating current electrical plug to assure alternating current voltage is available at said female alternating current electrical plug when said male alternating current electrical plug is connected to said alternating current voltage source independent of current flow through said electrical deicing element, and wherein alternating current voltage must be present in said electrically "hot" low resistance, minimal heat generating conductor for voltage to flow through said electrical deicing element.

16. The method of claim 15, by steps further comprising:
 supplying alternating current voltage to said electrical deicing element of said first thermally regulated electrical deicing apparatus; and
 regulating said alternating current supply to said electrical deicing element with a thermistor interposed between said alternating current voltage source and said heating element.

17. The method of claim 16, by steps further comprising:
 providing a second thermally regulated electrical deicing apparatus;
 positioning said second thermally regulated electrical deicing apparatus adjacent a window of the vehicle; and
 connecting said second thermally regulated electrical deicing apparatus to said first thermally regulated electrical deicing apparatus.

18. The method of claim 17, by steps further comprising:
supplying alternating current voltage through said first thermally regulated electrical deicing apparatus to a second heating element of said second thermally regulated electrical deicing apparatus; and
regulating said alternating current voltage supplied to said second heating element of said second thermally regulated electrical deicing apparatus with a second thermistor interposed between said alternating current voltage source and said second heating element.

* * * * *